United States Patent

[11] 3,623,796

[72] Inventor  Jose Schweiger
             Birmensdorf, Switzerland
[21] Appl. No. 846,695
[22] Filed     Aug. 1, 1969
[45] Patented  Nov. 30, 1971
[73] Assignee  Schweiger & Schweiger AG
             Zug, Switzerland
[32] Priority  Oct. 30, 1968
[33]           Switzerland
[31]           16173/68

[54] MIRROR WITH ADJUSTABLE FOCAL LENGTH
     11 Claims, 2 Drawing Figs.
[52] U.S. Cl. .................................... 350/295,
                           60/62.5, 350/161, 350/296
[51] Int. Cl. .................................... G02b 5/10,
                                                F15b 7/00
[50] Field of Search ............................. 350/295,
     296, 180, 278, 312, 161, 289; 60/62.5; 417/437,
                                              479

[56]         References Cited
          UNITED STATES PATENTS
2,952,189  9/1960  Pajes ........................... 350/295
            FOREIGN PATENTS
316,378   4/1934  Italy ............................ 350/295
982,680   2/1965  Great Britain ................ 350/312

Primary Examiner—David Schonberg
Assistant Examiner—John W. Leonard
Attorney—Michael S. Striker ABSTRACT: A mirror comprising a substantially concave housing with a light-reflecting resilient membrane airtightly secured to the edge of the housing across its base. Mounted on the housing is a compressible suction pump operative to create a partial vacuum in the interior of the housing such that the light-reflecting membrane is drawn inwardly into the housing to thus assume a substantially concave shape and to thereby adjust the focal length of the mirror.

PATENTED NOV 30 1971　　　　　　　　　　3,623,796

INVENTOR.
JOSE SCHVEIGA

3,623,796

MIRROR WITH ADJUSTABLE FOCAL LENGTH

BACKGROUND OF THE INVENTION

The present invention relates to a mirror with adjustable focal length.

Mirrors or reflectors are known whose surface is a paraboloid of revolution. Such a mirror gives a point focus for incident rays parallel to its axis. Such mirrors, for example, are used in search light and automobile lamps.

Further known, are asymmetric reflectors in which the beam of light produced is not symmetrical about a central axis.

These type of mirrors, however, have the inherent disadvantage that their focal length or plane, i.e., the plane at right angles to the principal axis of the mirror in which the image of a particular object is formed, cannot be adjusted.

SUMMARY OF THE INVENTION

Object of the invention therefore is to provide a reflecting mirror whose ratio of the focal length to the true center of the mirror is adjustable.

Such a mirror according to the present invention comprises a housing closed on all sides except one side thereof which is provided with an opening; a light-reflecting elastomeric resilient membrane covers the opening of the housing and is secured along the edge thereof so as to airtight enclose the interior of the housing; air evacuating means are exteriorly mounted on the housing for creating a partial vacuum in the interior of the housing so as to cause the light-reflecting resilient membrane to be drawn inwardly into the housing and which membrane thus assumes a substantially concave shape.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

PREFERRED EMBODIMENT OF THE INVENTION

Figure 1:
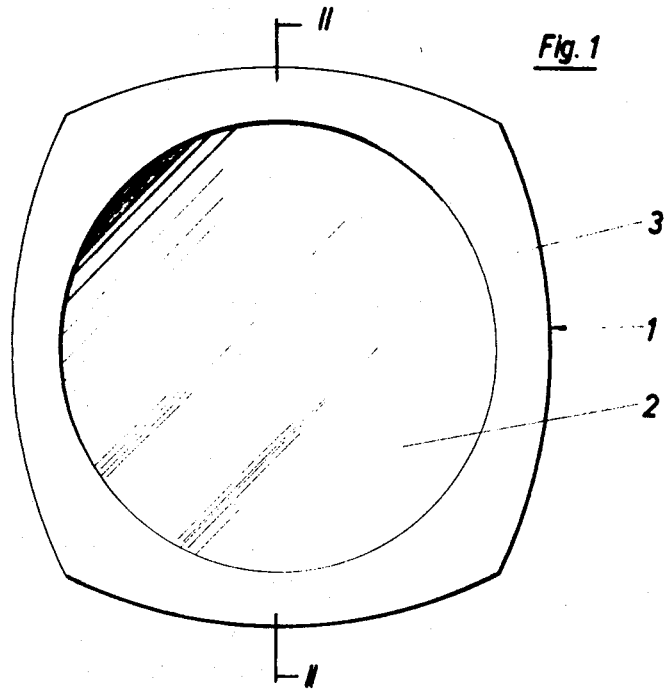
FIG. 1 illustrates a mirror according to the present invention.

Shown in FIG. 1 is a mirror 1 which is provided with a circular reflecting surface 2 which is formed by an elastomeric deformable mirror foil. The reflecting surface 2 is peripherally secured within a mirror frame 3.

Figure 2:
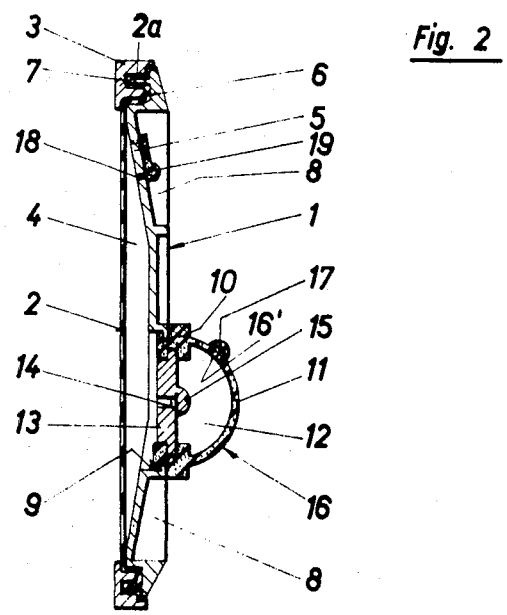
FIG. 2 is a cross-sectional view taken on the line II—II of FIG. 1.

As shown in FIG. 2, the mirror 1 is seen to comprise a housing which in airtight fashion encloses a hollow interior 4. The wall formed by the mirror foil 2 extends in an axial plane while the wall 5 of the housing, opposite the foil wall 2, forms a concavity and is provided along its circumference with a substantially U-shaped portion 6. The mirror frame 3 is arranged with a corresponding U-shaped portion 7 which interlocks with U-shaped portion 6 and forms a friction fit therewith. Sandwiched and secured intermediate the U-shaped portions 6 and 7 are marginal portions 2a of the foil 2. In addition, an adhesive may be used to adhere the marginal portions 2a to the respective U-shaped portions 6 and 7, or alternatively the marginal portion 2a may be vulcanized to the U-shaped portions 6 and 7. The wall 5 is supported along its outer curved circumference by reinforcement sections in the form of ribs 8 and, together with the frame 7, constitutes a rigid carrier for the mirror foil 2.

The wall 5 of the housing is provided with an opening 9 in which an annular member 10 is secured. The member 10 comprises a compressible suction pump 11 which is arcuately shaped and is integrally formed with the member 10 and made of the same material as the member 10. The pump 11 seals the hollow interior 4 from the atmosphere exteriorly of the housing Defined within the concave interior of the pump 11 is a further hollow material 12 which is separated from the interior 4 by means of a partition member 13. The member 13 is formed with a passage 14 which interconnects the interiors 4 and 12. The passage 14 is airtight closed in the interior 12 by means of a valve member 15 which, in this instance, is a pivotable lip normally overlying the passage in the interior 12 and operative between a normally closed position and an open venting position in response to compression and expansion of the flexible pump 11. To this end, compression of the pump 11 causes air contained or entrapped within the interior 12 to be expelled therefrom to the atmosphere via an outlet 16 which is normally closed exteriorly of the pump by a valve member 17, which may be a lip overlying the outlet and which, when desired, may be opened to release air from the interior 12.

Upon compression of the pump and during its subsequent expansion thereof, the valve 15 is opened and air contained in the interior 4 of the housing is now drawn out therefrom via passage 14 into the interior 12 of the pump. Reentry of air into the interior 4 of the housing is prevented in that the lip 15 automatically returns to its closed position following the expulsion of air from the interior 4.

During creation of partial vacuum in the interior 4, the mirror foil is sucked against the wall 5 such that a substantially concave reflecting mirror is produced with a larger focal length.

The degree of partial vacuum in the hollow interior 4 and thereby the degree of concavity of the mirror foil 2, may be varied on the one hand by repeatedly compressing the suction pump 11 to draw out a maximum amount of air from the interior 4 and on the other hand, by admitting air into the interior 4 by means of inlet 18 which is normally closed by a valve member 19 overlying the inlet.

It will be understood, that by admitting air into the interior 4, atmospheric pressure is restored therein such that the mirror foil 2 assumes its axial position.

It will further be understood that with the above arrangement, air can be selectively withdrawn from or supplied to the interior 4 so as to effect a desired focal length of the mirror.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A compact mirror with adjustable focal length comprising, in combination, a substantially plateshaped rigid housing having an open concave side; a light-reflecting elastomeric resilient membrane covering said open side of said housing and being secured to the latter along the edge thereof so as to airtightly close said open side of said housing; manually operable air evacuating means mounted on said housing on the side thereof opposite said open side for creating a partial vacuum in the interior of said housing so as to cause said light reflecting membrane to be drawn inwardly and to thus change the focal length thereof, said air evacuating means comprising a compressible and expandable suction pump of elastomeric material having a hollow interior and an outlet providing communication between said hollow interior and the atmosphere; passage means interconnecting said interior of said suction pump with the interior of said housing; and valve means normally closing said passage means.

2. A mirror as defined in claim 1 wherein said valve means is movable between a normally closed and an open venting position in response to compression and expansion of said pump.

3. A mirror as defined in claim 1, wherein said pump is substantially concave and having its edge fixedly secured to said housing, and wherein said valve means is a pivotable lip member overlying said passage means within the interior of said concave pump.

4. A mirror as defined in claim 3, wherein said housing is provided with air admitting means.

5. A mirror as defined in claim 4, wherein said air admitting means includes an inlet and a valve member normally closing said inlet.

6. A mirror as defined in claim 1, wherein said light-reflecting membrane is secured along the edge of said housing by means of a connecting member.

7. A mirror as defined in claim 6, wherein said connecting member is annular and has a substantially U-shaped cross section, and wherein said edge of said housing is substantially circular and has a corresponding substantially U-shaped cross section airtight interlocking with said U-shaped connecting member, said light-reflecting membrane being sandwiched between said interlocking edge and connecting member.

8. A mirror as defined in claim 7, wherein an adhesive is provided intermediate said respective interlocking U-shaped members for bonding said light-reflecting membrane thereto.

9. A mirror as defined in claim 8, wherein said light-reflecting membrane is vulcanized to at least one of said mentioned U-shaped members.

10. A mirror as defined in claim 1, and comprising reinforcement means for supporting said substantially concave housing.

11. A mirror as defined in claim 10, wherein said reinforcement means are secured to said substantially concave housing along the outer circumference thereof.

* * * * *